United States Patent
Zheng et al.

(10) Patent No.: US 9,774,610 B2
(45) Date of Patent: Sep. 26, 2017

(54) CERTIFICATELESS DATA VERIFICATION WITH REVOCABLE SIGNATURES

(71) Applicant: Futurewei Technologies, Inc., Plano, TX (US)

(72) Inventors: Qingji Zheng, Sunnyvale, CA (US); Guoqiang Wang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 30 days.

(21) Appl. No.: 14/810,950

(22) Filed: Jul. 28, 2015

(65) Prior Publication Data
US 2017/0034186 A1    Feb. 2, 2017

(51) Int. Cl.
H04L 29/06    (2006.01)
H04L 9/32    (2006.01)

(52) U.S. Cl.
CPC .......... *H04L 63/126* (2013.01); *H04L 9/3236* (2013.01); *H04L 9/3247* (2013.01); *H04L 63/0428* (2013.01)

(58) Field of Classification Search
CPC ... H04L 63/126; H04L 9/3236; H04L 9/3247; H04L 63/0428
See application file for complete search history.

(56) References Cited

U.S. PATENT DOCUMENTS

| 8,645,702 B2 | 2/2014 | Zhang et al. | |
|---|---|---|---|
| 2002/0164034 A1* | 11/2002 | Asano | G06F 21/10 380/278 |
| 2003/0061481 A1* | 3/2003 | Levine | H04L 9/0836 713/163 |
| 2003/0142824 A1* | 7/2003 | Asano | G06F 21/10 380/277 |
| 2004/0125959 A1* | 7/2004 | Beuque | H04L 9/0891 380/279 |
| 2005/0147240 A1* | 7/2005 | Agrawal | G06F 21/60 380/28 |
| 2005/0246533 A1* | 11/2005 | Gentry | H04L 9/0836 713/170 |
| 2006/0107043 A1* | 5/2006 | Kim | H04L 9/0891 713/163 |

(Continued)

OTHER PUBLICATIONS

Naor, Dalit, et al., "Revocation and Tracing Schemes for Stateless Receivers", J. Kilian (Ed.): CRYPTO 2001, LNCS 2139, pp. 41-62, 2001, Copyright Springer-Verlag Berlin Heidelberg 2001, (2001), 22 pgs.

(Continued)

*Primary Examiner* — Joseph P Hirl
*Assistant Examiner* — J. Brant Murphy
(74) *Attorney, Agent, or Firm* — Schwegman Lundberg & Woessner

(57) ABSTRACT

A method comprises accessing, by a processor of a machine, an encrypted data packet from a first source, the encrypted data packet being accompanied by a signature of the first source. The processor further accesses parameters from a second source and verifies, based on the signature of the first source and the parameters, that the encrypted data packet was generated by the first source. The method further comprises decrypting, based on the verification that the encrypted data packet was generated by the first source, by the processor, the encrypted data packet.

14 Claims, 11 Drawing Sheets

(56) References Cited

U.S. PATENT DOCUMENTS

| | | | | |
|---|---|---|---|---|
| 2007/0079118 A1* | 4/2007 | Chmora | ............... | H04L 9/0822 |
| | | | | 713/163 |
| 2012/0166806 A1* | 6/2012 | Zhang | ................. | H04L 9/3247 |
| | | | | 713/176 |
| 2013/0198838 A1* | 8/2013 | Schmidt | ............... | H04L 9/3234 |
| | | | | 726/22 |
| 2014/0096271 A1* | 4/2014 | Wang | ..................... | G06F 21/10 |
| | | | | 726/30 |

OTHER PUBLICATIONS

Paterson, K. G., "Chapter X—Cryptography from Pairings", Advances in Elliptic Curve Cryptography, Edited by Blake et al., London Mathematical Society Lecture Note Series (No. 317), Publisher Cambridge University Press, 2005, (2005), 65 pgs.

Smart, Nigel Paul, "Cryptography: An Introduction", Published by McGraw-Hill, 2003, ISBN 0077099877, 9780077099879, (2003), 436 pgs.

\* cited by examiner

CERTIFICATELESS DATA VERIFICATION WITH REVOCABLE SIGNATURES

TECHNICAL FIELD

Embodiments of the present disclosure relate generally to data processing and, more particularly, but not by way of limitation, to methods and systems for certificateless data verification with revocable signatures.

BACKGROUND

Conventionally, messages are sent unsigned or signed. Unsigned messages cannot have their senders verified. Signed messages are verified using a central authority or a certificate authority.

The receiver of a message to be verified using a central authority receives a public key from the central authority that corresponds to the sender. Successful decryption of the message verifies the identity of the sender. The central authority holds the public and private keys of all members, and thus can send messages as if it were any member.

The receiver of a message to be verified using a certificate authority verifies the certificate with the certificate authority and extracts the verification key from the certificate.

SUMMARY OF THE INVENTION

In some example embodiments, what is disclosed is a method comprising: accessing, by a processor of a machine, an encrypted data packet from a first source, the encrypted data packet being accompanied by a signature of the first source; accessing, by the processor, parameters from a second source; verifying, by the processor, based on the signature of the first source and the parameters, that the encrypted data packet was generated by the first source; and based on the verification that the encrypted data packet was generated by the first source, decrypting, by the processor, the encrypted data packet.

In some example embodiments, what is disclosed is a system comprising: a communication device configured to: access an encrypted data packet from a first source, the encrypted data packet being accompanied by a signature of the first source; and access parameters from a second source; a processor-implemented verification device configured to: verify, based on the signature of the first source and the parameters, that the encrypted data packet was generated by the first source; and a decryption device configured to: based on the verification that the encrypted data packet was generated by the first source, decrypt the encrypted data packet.

In some example embodiments, what is disclosed is a machine-readable medium not having any transitory signals and having instructions embodied thereon which, when executed by one or more processors of a machine, cause the machine to perform operations comprising: accessing an encrypted data packet from a first source, the encrypted data packet being accompanied by a signature of the first source; accessing parameters from a second source; verifying, based on the signature of the first source and the parameters, that the encrypted data packet was generated by the first source; and based on the verification that the encrypted data packet was generated by the first source, decrypting the encrypted data packet.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A key generation center initiates a set of global system parameters and partial private keys for each authorized sender. The global system parameters are made available to the authorized senders and to all receivers. The partial private keys are communicated on secure channels to the corresponding authorized senders.

An authorized sender publishes data including an identifier of the sender, a signature of the sender, a public key of the sender, and a message (e.g., an encrypted or unencrypted message). The published data is accessed by a receiver. The receiver verifies that the message was sent by an authorized sender using the parameters published by the key generation center and the data published by the sender.

One or more of the authorized senders may be revoked, and no longer be authorized. The key generation center generates update data, which is made publically available (e.g., available to the senders and receivers). As a result, future messages received by receivers from a revoked sender will, when verified, indicate that the source is no longer authorized. An unauthorized sender, not having access to the partial private keys of authorized senders, will be unable to sign a message using another sender's signature.

Figure 1:
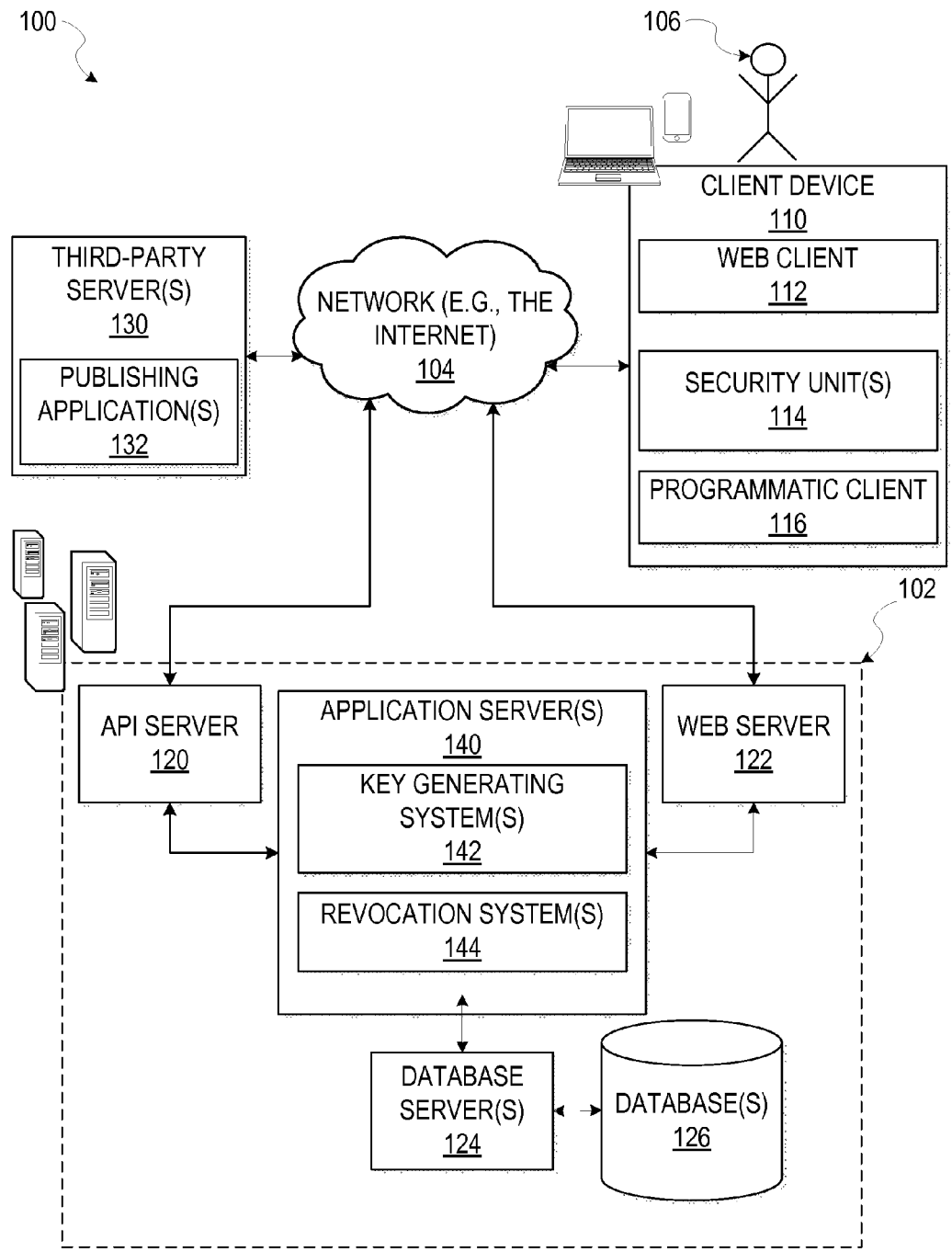
FIG. 1 is a block diagram illustrating a networked system suitable for certificateless data verification with revocable signatures, according to some example embodiments.

With reference to FIG. 1, an example embodiment of a high-level client-server-based network architecture 100 is shown. A networked system 102 provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), a security unit 114, and a programmatic client 116 executing on the client device 110.

The client device 110 may comprise, but is not limited to, a mobile phone, desktop computer, laptop, portable digital assistant (PDA), smart phone, tablet, ultra book, netbook, multi-processor system, microprocessor-based or programmable consumer electronics, or any other communication device that a user may utilize to access the networked system 102. In some embodiments, the client device 110 may comprise a display device (not shown) to display information (e.g., in the form of user interfaces). The client device 110 may be a device of a user that is used to receive one or more signed messages. In one embodiment, the networked system 102 is a network-based system for key generation. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each client device 110 may include one or more applications (also referred to as "apps") such as, but not limited to, a web browser, a messaging application, an electronic mail (email) application, a security unit, and the like. In some embodiments, if the security unit is included in a given client device 110, then this unit is configured to locally provide the user interface and at least some of the functionalities of a security system, with the unit configured to communicate with the networked system 102, on an as-needed basis, for data or processing capabilities not locally available (e.g., access to global security parameters). Conversely, if the security unit is not included in the client device 110, the client device 110 may use its web browser to access a security system (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 120 and a web server 122 are coupled to, and provide programmatic and web interfaces respectively to, one or more application servers 140. The application servers 140 host one or more key generating systems 142 and revocation systems 144, each of which comprises one or more devices or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be accessed by the key generating systems 142 and the revocation systems 144.

Additionally, one or more publishing applications 132, communicating with or integrated into third-party servers 130, are shown as having programmatic access to the networked system 102 via the programmatic interface provided by the API server 120. For example, the third-party server 130 receives, on a secure channel, private key information from the key generating system 142.

The key generating systems 142 provide public parameters to the client device 110, the third-party servers 130, the revocation system 144, or any suitable combination thereof. The revocation systems 144 may generate updated data for the client device 110 and the third-party servers 130 based on user revocations. While the key generating system 142 and revocation system 144 are shown in FIG. 1 to both form part of the networked system 102, it will be appreciated that, in alternative embodiments, each system 142 and 144 may form part of a communication or control service that is separate and distinct from the networked system 102. In some embodiments, the revocation systems 144 form part of the key generating system 142.

Further, while the client-server-based network architecture 100 shown in FIG. 1 employs a client-server architecture, the present inventive subject matter is, of course, not limited to such an architecture, and could equally well find application in a distributed, or peer-to-peer, architecture system, for example.

The web client 112 may access the various key generating and revocation systems 142 and 144 via the web interface supported by the web server 122 and the publishing applications 132 via a web interface supported by the third-party servers 130. Similarly, the programmatic client 116 accesses the various services and functions provided by the key generating and revocation systems 142 and 144 via the programmatic interface provided by the API server 120.

Figure 2:
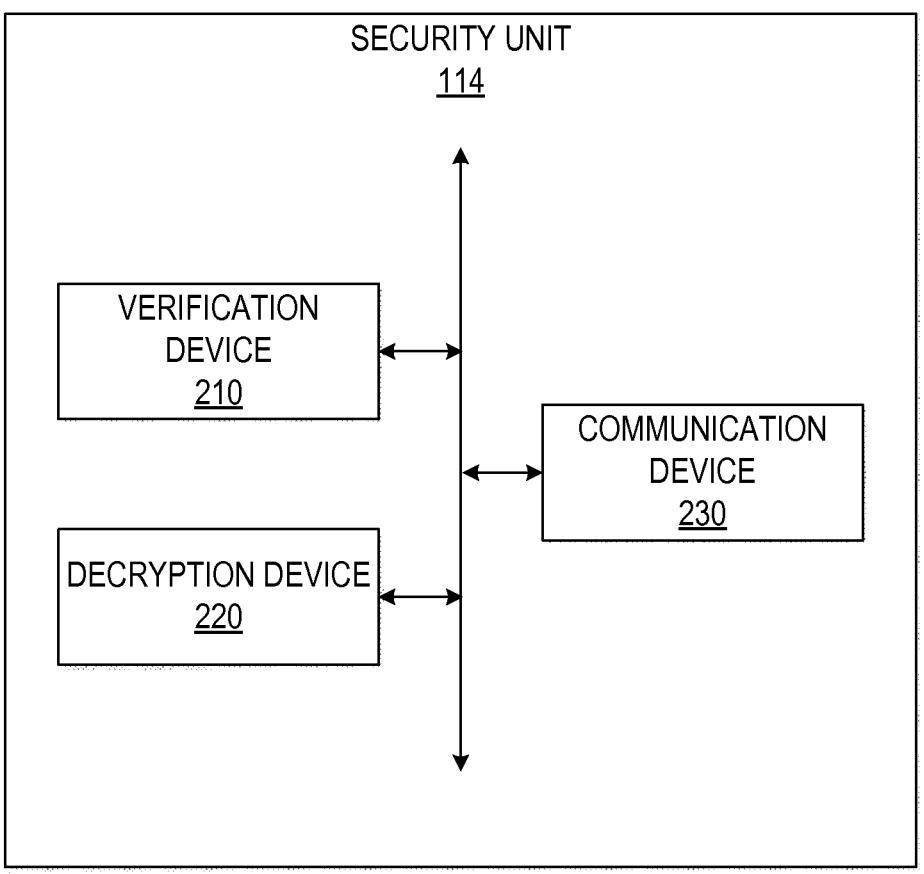
FIG. 2 is a block diagram illustrating devices of a computer system suitable for certificateless data verification, according to some example embodiments.

FIG. 2 is a block diagram 200 illustrating devices of a security unit 114 suitable for certificateless data verification, according to some example embodiments. Devices may be comprised of hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. As shown in FIG. 2, the security unit 114 includes a verification device 210, a decryption device 220, and a communication device 230. In some example embodiments, the devices of the security unit 114 are combined into a single hardware module. In other example embodiments, features of the disclosed devices are divided into more or fewer hardware modules.

The verification device 210 verifies that a particular message was generated by an authorized node. For example, an encrypted message may be accompanied by a data block that indicates the node that generated the message, a signature, and a key for decrypting the message. The verification device 210 evaluates the signature, using parameters received from a trusted key generation center, to determine if the encrypted message was generated by the identified node, if the identified node is an authorized node, or both.

In some example embodiments, the verification device 210 is implemented by a physical device that manages cryptographic keys and provides cryptographic operation. The verification device 210 may be programmable to allow a variety of cryptographic algorithms to be implemented. For example, Java®, C, or C++ may be used to program the verification device 210. Example physical devices to implement the verification device 210 include a plug-in card, a USB-connected device, a dongle, a configured central processing unit (CPU) or graphics processing unit (GPU), or any suitable combination thereof.

The decryption device 220 decrypts the encrypted message, making the contents available to the user 106 or to other applications on the client device 110. The decryption may be performed using the key that accompanied the message. The decryption device 220 may be programmable to allow a variety of decryption algorithms to be implemented. For example, Java®, C, or C++ may be used to program the decryption device 220. Example physical devices to implement the decryption device 220 include a plug-in card, a USB-connected device, a dongle, a configured central processing unit (CPU) or graphics processing unit (GPU), or any suitable combination thereof.

The communication device 230 sends data to and receives data from other systems (e.g., the systems shown in FIG. 1). For example, the communication device 230 may receive data from the third-party servers 130 and application servers 140 and send data to the revocation systems 144, key generating systems 142, third-party servers 130, or any suitable combination thereof. The communication device 230 may be programmable to allow a variety of communication protocols to be implemented. For example, Java®, C, or C++ may be used to program the communication device 230. Example physical devices to implement the communication device 230 include a plug-in card, a USB-connected device, a modem, a network adapter, a configured central processing unit (CPU) or graphics processing unit (GPU), or any suitable combination thereof.

In some example embodiments, communications received by the communication device 230 cause the display of a user interface on the client device 110. For example, the communication device 230 may receive a web page for a web browser of the client device 110. The web browser parses the web page to generate a user interface on the client device 110, for display to the user 106.

Figure 3:
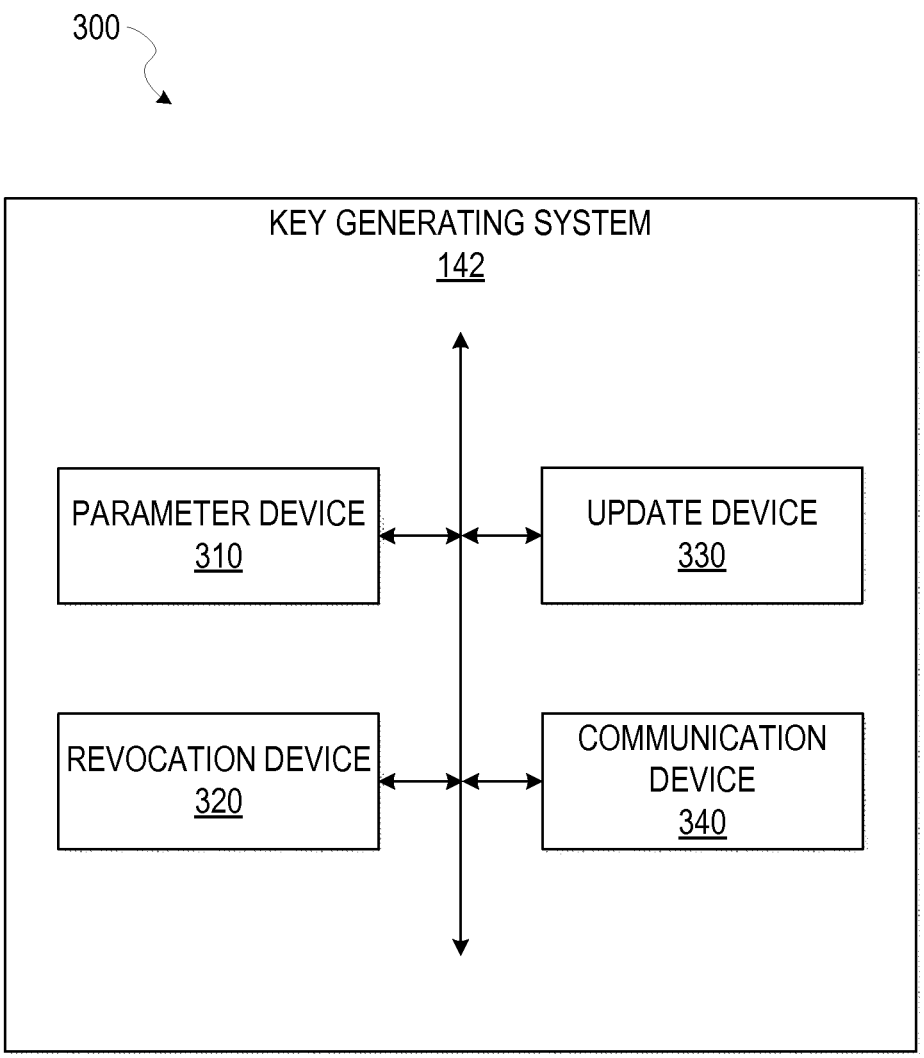
FIG. 3 is a block diagram illustrating devices of a computer system suitable for supporting certificateless data verification with revocable signatures, according to some example embodiments.

FIG. 3 is a block diagram 300 illustrating devices of a key generating system 142 suitable for supporting certificateless data verification with revocable signatures, according to some example embodiments. As shown in FIG. 3, the key generating system 142 includes a parameter device 310, a revocation device 320, an update device 330, and a communication device 340.

The parameter device 310 generates a set of global parameters for an encryption scheme in which multiple nodes (e.g., third-party servers 130) are authorized senders of messages. The parameter device 310 may be programmable to allow a variety of parameter-selection or parameter-generation procedures to be implemented. For example, Java®, C, or C++ may be used to program the parameter device 310. Example physical devices to implement the parameter device 310 include a plug-in card, a USB-connected device, a dongle, a configured central processing unit (CPU) or graphics processing unit (GPU), or any suitable combination thereof.

The global parameters are made available (e.g., broadcast, placed in an accessible repository, directly sent to each recipient, or any suitable combination thereof) to the nodes and the recipients of data (e.g., third-party servers 130, client device 110, or both). The parameter device 310 also generates private parameters for each node. The private parameters may be based on the position of the node in a tree (e.g., a binary tree in which the nodes correspond to leaves of the tree). The private parameters for each node are sent to the node via a secure channel.

The revocation device 320 revokes the authorization of nodes. In some example embodiments, the revocation device 320 is implemented as part of the key generating system 142. In other example embodiments, the revocation device 320 is part of the revocation system 144. The revocation device 320 may be programmable to allow a variety of node authorization revocation procedures to be implemented. For example, Java®, C, or C++ may be used to program the revocation device 310. Example physical devices to implement the revocation device 310 include a plug-in card, a USB-connected device, a dongle, a configured central processing unit (CPU) or graphics processing unit (GPU), or any suitable combination thereof.

Figure 5:
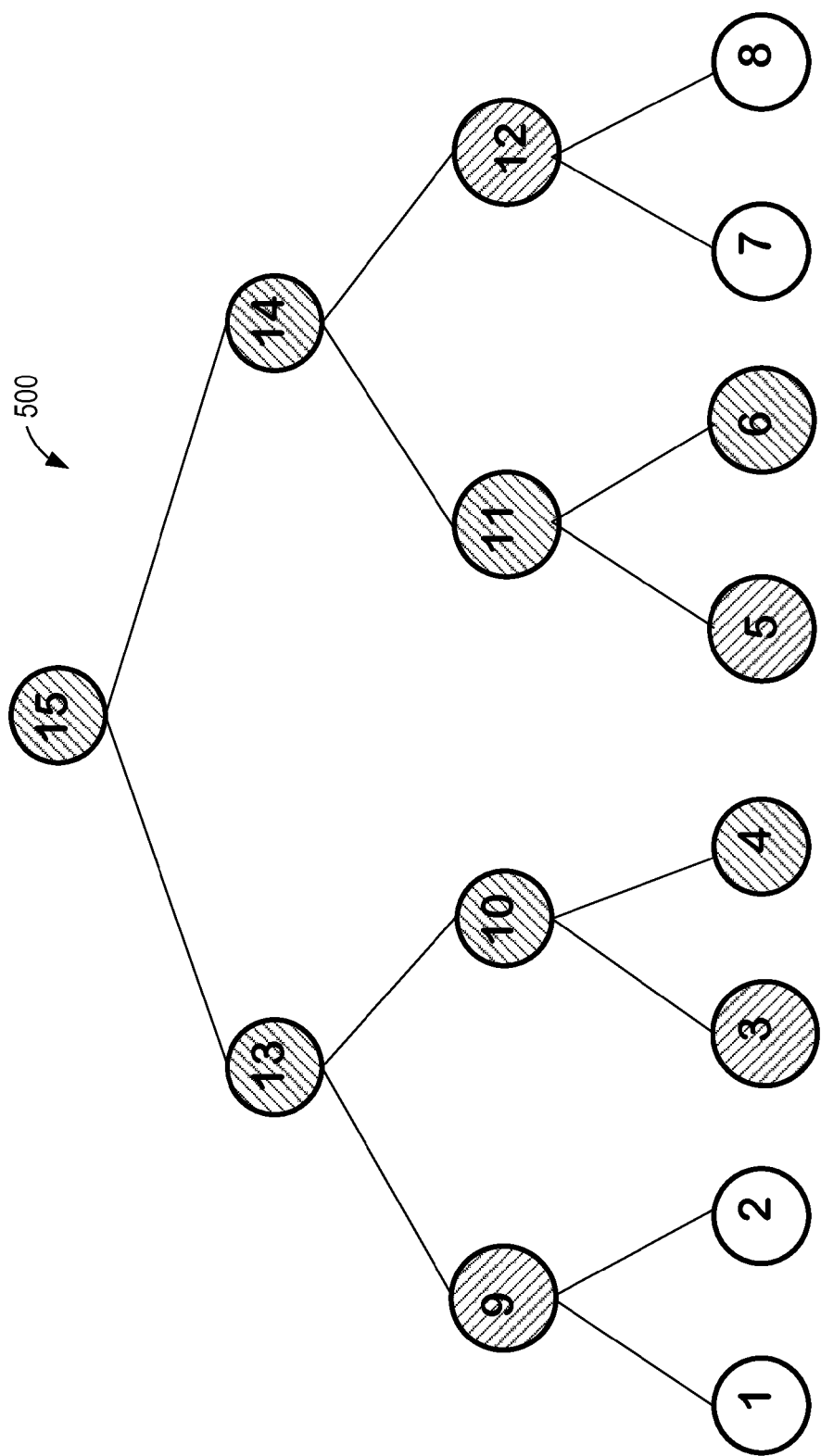
FIG. 5 is a representation of a binary tree data structure, useful in certificateless data verification with revocable signatures, according to some example embodiments.

Updated global parameters are made available to the nodes and recipients of data. The updated parameters may be based on a cover set of nodes in a tree. The cover set is the smallest set of nodes in the tree that contain (either directly or as descendent nodes) all of the authorized nodes and no revoked nodes. FIG. 5, described in more detail below, shows an example tree including a cover set, authorized nodes, and revoked nodes.

The update device 330 publishes updated parameters to the nodes and recipients. For example, the parameters generated by the parameter device 310 may expire after a predetermined period of time. After the expiration of time, the update device 330 may update the parameters and publish them. The update device 330 may be programmable to allow a variety of parameter updating procedures to be implemented. For example, Java®, C, or C++ may be used to program the update device 330. Example physical devices to implement the update device 330 include a plug-in card, a USB-connected device, a dongle, a configured central processing unit (CPU) or graphics processing unit (GPU), or any suitable combination thereof.

The communication device 340 sends data to and receives data from other systems (e.g., the systems shown in FIG. 1). For example, the communication device 340 may receive data from the third-party servers 130 and client device 110 and send data to the third-party servers 130, client device 110, or any suitable combination thereof. The communication device 340 may be programmable to allow a variety of communication protocols to be implemented. For example, Java®, C, or C++ may be used to program the communication device 340. Example physical devices to implement the communication device 340 include a plug-in card, a USB-connected device, a modem, a network adapter, a configured central processing unit (CPU) or graphics processing unit (GPU), or any suitable combination thereof.

In some example embodiments, communications sent by the communication device 340 cause the display of a user interface on the client device 110. For example, the communication device 340 may transmit a web page for a web browser of the client device 110. The web browser parses the web page to generate a user interface on the client device 110, for display to the user 106.

Figure 4:
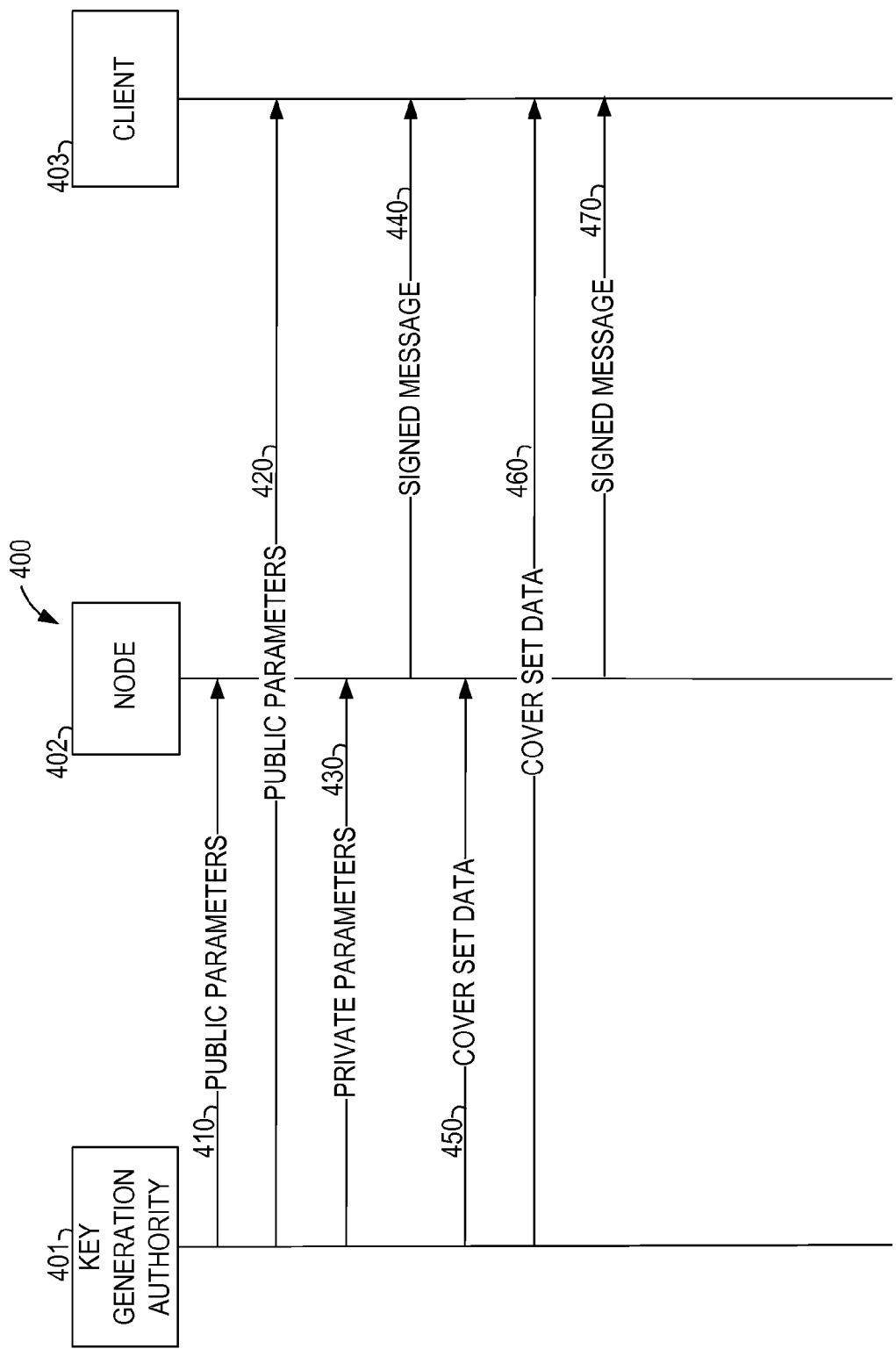
FIG. 4 is a communication diagram illustrating communications between a key generation authority, a node, and a client in implementing certificateless data verification with revocable signatures, according to some example embodiments.

FIG. 4 is a communication diagram 400 illustrating communications between a key generation authority 401, a node 402, and a client 403 in implementing certificateless data verification with revocable signatures, according to some example embodiments. In some example embodiments, the key generation authority 401 corresponds to the application server 140, the node 402 corresponds to the third-party server 130, and the client 403 corresponds to the client device 110. By way of example and not limitation, the communications of the communication diagram 400 are described as being generated by the devices of FIGS. 1-3.

In communications 410 and 420, public parameters generated by the parameter device 310 are transmitted to the node 402 and the client 403, respectively. In communication 430, private parameters for the node 402, generated by the parameter device 310, are transmitted to the node 402. The private parameters are transmitted via a secure channel.

In communication 440, the node 402 sends a signed message to the client 403. The signed message is generated by the publishing application 132 using the public and private parameters received by the node 402 from the key generation authority 401. The client 403, using the verification device 210 and the decryption device 220 to apply the public parameters to the signed message, verifies that the node 402 is an authorized node, verifies that the node 402 is the signer of the signed message, and decrypts the signed message.

In communications 450 and 460, cover set data generated by the update device 330 is transmitted to the node 402 and the client 403, respectively. In some example embodiments, if the node 402 is no longer authorized, cover set data is not sent to the node 402. In other example embodiments, cover set data is broadcast or placed in a public repository for retrieval by interested parties, including unauthorized nodes. The cover set data includes values corresponding to nodes in a tree that include all authorized nodes. In communication 470, the node 402 sends another signed message to the client 403. If the node 402 is not covered by the cover set data transmitted in communications 450 and 460, the signed message of communication 470 will, when processed by the verification device 210 of the client 403, show that the signer is unauthorized. The decryption device 220 may decrypt the message using a key accompanying the message or may choose not to decrypt the message in response to the determination that the signer is unauthorized. If the node 402 is covered by the cover set data, the signed message of communication 470 will, like the signed message of communication 440, show that the node 402 is an authorized sender.

FIG. 5 is a representation of a binary tree data structure 500, useful in certificateless data verification with revocable signatures, according to some example embodiments. The binary tree data structure 500 comprises 15 nodes, of which 8 are leaf nodes. Each node is labeled 1-15 and may be referred to herein as $v_1$-$v_{15}$, indicating the vertex number of each node. The leaf nodes are also labeled with corresponding identifiers denoted $ID_1$-$ID_8$ (not shown). The nodes have different fill patterns, dividing them into three groups. Nodes 3, 5, 9, and 12 are shown with a first pattern; nodes 4, 6, 10, 11, 13, 14, and 15 are shown with a second pattern; the remaining nodes are shown with no pattern. In this example, nodes 1-8 were the original authorized nodes. Since then, nodes 4 and 6 have been revoked. Accordingly, nodes 1-3, 5, 7, and 8 remain authorized. The cover set of nodes is the smallest set of nodes that covers the six authorized nodes but not the two unauthorized nodes. That set is made of nodes 9 (covering nodes 1 and 2), 3, 5, and 12 (covering nodes 7 and 8). Thus, the first pattern of nodes 3, 5, 9, and 12 indicates the current cover set. The second pattern of nodes 4, 6, 10, 11, 13, 14, and 15 indicates the nodes not covered by the current cover set.

Figure 6:
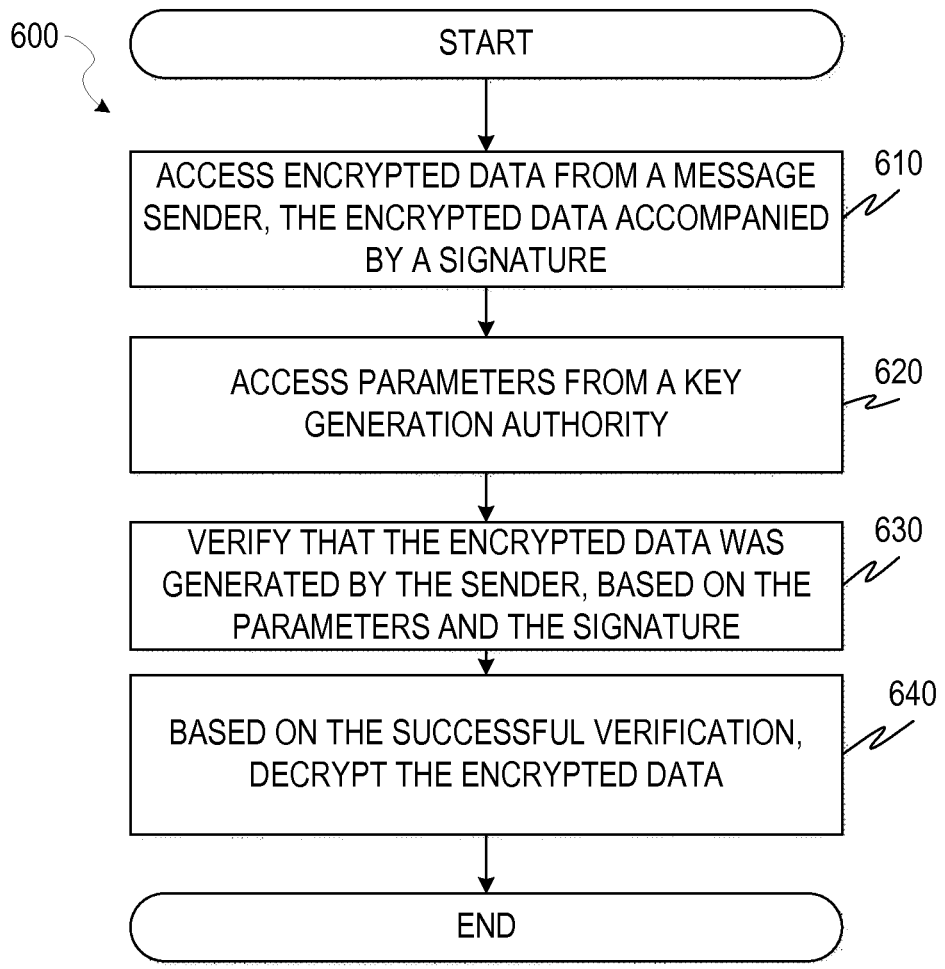
FIG. 6 is a flow diagram illustrating operations of a computer system suitable for certificateless data verification, according to some example embodiments.

FIG. 6 is a flow diagram illustrating operations of a computer system implementing a process 600 suitable for certificateless data verification, according to some example embodiments. By way of example and not limitation, the operations of the method 600 are described as being performed by the devices of FIG. 2.

In operation 610, the verification device 210 accesses encrypted data from a message sender accompanied by a signature. For example, the encrypted data and signature may be accessed from a public data repository, downloaded from a web server of the sender, received over a private communication channel from the sender, or any suitable combination thereof.

The verification device 210 also accesses parameters from a key generation authority (operation 620). For example, the parameters may have been received from the key generation authority, published by the key generation authority to a public server from which they were downloaded by the communication device 230, or any suitable combination thereof.

The verification device 210 verifies that the encrypted data was generated by the sender, using the parameters and signature (operation 630). In some example embodiments, the verification makes use of the equations below. In those equations, some of the referenced values are provided as part of or along with the message: m represents the encrypted message itself, id is an identifier of the sender, T is the time at which the encrypted message was generated, $pk_{id}$ is the public key corresponding to the identifier (composed of two, separable, portions, $pk_1$ and $pk_2$, concatenated together), and $R_1$, $U_1$, $U_2$, $X_v$, $E_v$, and $F_v$ are included in the signature generated by the sender. Additional referenced values are provided in the parameters accessed in operation 620: the functions $H_0$-$H_5$ are hash functions, h is a randomly selected value in G, g is a generator, e is a bilinear map that maps $G \times G \rightarrow G_1$ using g, and $g^\alpha$ and $g^\beta$ are values generated using g. G is a group of elements (x,y). The order of the group G is p. Accordingly, for any value g in the group G, $g^p = g$ and no value g in the group G is equal to 0.

$$Q_1 = H_4(m, id, pk_1, pk_2, U_1, U_2, X_v, E_v, F_v)$$

$$Q_2 = H_5(m, id, pk_1, pk_2, U_1, U_2, X_v, E_v, F_v)$$

$$Q_3 = \frac{e(U_1, g)}{e(X_v, H_1(id))}$$

$$Q_4 = \frac{e(F_v, g)}{e(H_2(T), E_v)}$$

Using the generated values $Q_1$-$Q_4$ and the data accessed in operations 610 and 620, the signature is verified when both of the equations below are true:

$$Q_3^{\frac{T}{T-id}} Q_4^{\frac{id}{id-T}} = e(g^\beta, h)e(H_0(m), U_2)^{\frac{T}{T-id}}$$

$$e(R_1, g) = e(pk_2, Q_1)e\left(pk_1(g^\alpha)^{H_2(id,pk_1,g^\alpha,g^\beta)}, Q_2\right)$$

In operation 640, the decryption device 220 decrypts the encrypted data based on the successful verification. For example, if the verification described above is successful, the decryption device 220 may use the $pk_{id}$ key to decrypt the message m.

Figure 7:
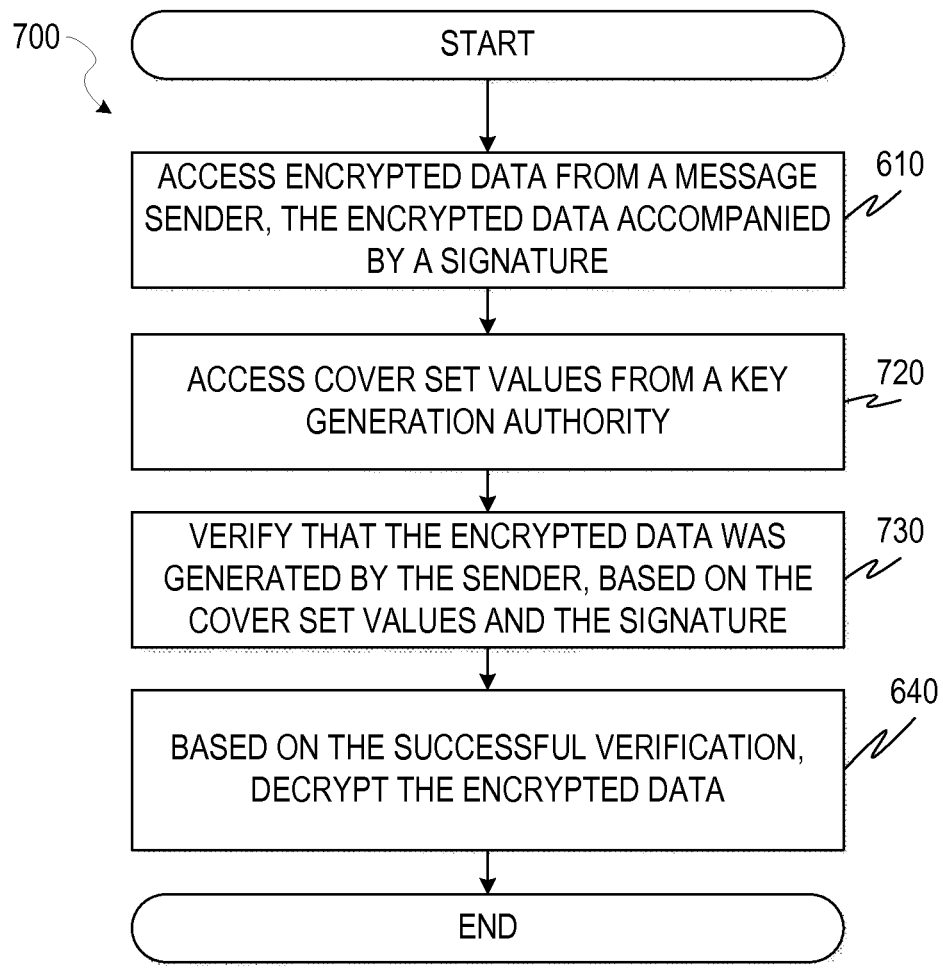
FIG. 7 is a flow diagram illustrating operations of a computer system suitable for certificateless data verification, according to some example embodiments.

FIG. 7 is a flow diagram illustrating operations of a computer system implementing a process 700 suitable for certificateless data verification, according to some example embodiments. By way of example and not limitation, the operations of the method 700 are described as being performed by the devices of FIG. 2. The operations 610 and 640 of the process 700 are described above with respect to the process 600 of FIG. 6.

In operation 720, the verification device 210 accesses cover set values from a key generation authority. The cover set values indicate which senders remain authorized by the key generation authority. For example, functions may be associated with each node in a tree having authorized senders associated with the leaf nodes, such as the example hierarchy of FIG. 5. The functions corresponding to the cover set may be evaluated using a current time T as the independent variable. The results from each evaluated function may be published as the cover set values.

In operation 730, the verification device 210 verifies that the encrypted data was generated by the sender, based on the cover set values and the signature. For example, the $E_v$ and $F_v$ values provided by the sender may be checked against a list of valid $E_v$ and $F_v$ values provided in the cover set values. If the sender's $E_v$ and $F_v$ values are not in the authorized list, the sender is unauthorized.

Figure 8:
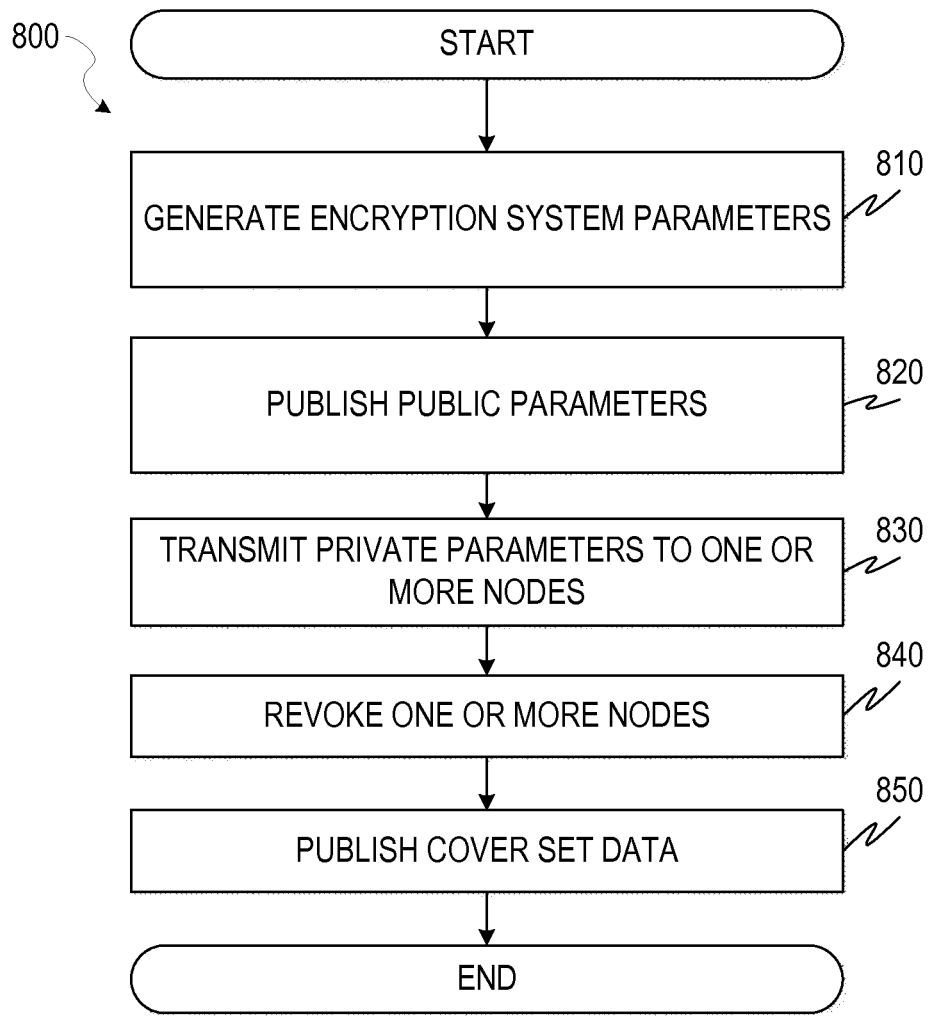
FIG. 8 is a flow diagram illustrating operations of a computer system suitable for supporting certificateless data verification with revocable signatures, according to some example embodiments.

FIG. 8 is a flow diagram illustrating operations of a computer system implementing a process 800 suitable for supporting certificateless data verification with revocable signatures, according to some example embodiments. By way of example and not limitation, the operations of the method 800 are described as being performed by the devices of FIG. 3.

In operation 810, the parameter device 310 generates parameters for the encryption system. The generated parameters include public parameters for general publication, private parameters for each authorized node, and secret parameters closely held by the key generating system 142.

In some example embodiments, the following steps are performed by the parameter device 310 in generating the parameters. A large prime number, p, is identified. The set $Z_p^*$ is defined to be the set of numbers in the range 1 to p−1. Two values ($\alpha$ and $\beta$) are selected at random from $Z_p^*$.

A bilinear map, e, is generated that maps $G \times G \to G_1$. The bilinear map e is computable in polynomial time and further satisfies the equations below:

$$e(g^a, g^b) = e(g,g)^{ab} \text{ for } \forall a,b \text{ in } Z_p^*$$

$$e(g,g) \neq 1$$

In this example embodiment, two values (g and h) are selected at random from G. An l-bit number (e.g., 128 bits, 256 bits, 512 bits, or another size), $\lambda$, is selected such that $\lambda$ is in $Z_p^*$. Two vectors (u and v) are selected such that they each have length l+1, and each element in each vector is selected at random from G. Hash functions $H_0$-$H_5$ are defined as follows:

$$H_0: \{0,1\}^* \to G$$

$$H_1(\lambda) = u_o \prod_{j=1}^{l} u_j^{\lambda_j}$$

$$H_2(\lambda) = v_o \prod_{j=1}^{l} v_j^{\lambda_j}$$

$$H_3: Z_p^* \times G^3 \to G$$

$$H_4: \{0,1\}^* \times Z_p^* \times G^7 \to G$$

$$H_5: \{0,1\}^* \times Z_p^* \times G^7 \to G$$

For each node v in a binary tree having n leaf nodes corresponding to n signers, a value $a_v$ is randomly selected in $Z_p^*$. A polynomial $f_v(x) = a_v x + \beta$ is defined for each node v.

In operation 820, the communication device 340 publishes the public parameters. In the example embodiments discussed above with respect to operation 810, the public parameters comprise e, G, $G_1$, p, g, $g^\alpha$, $g^\beta$, h, $H_0$, $H_1$, $H_2$, $H_3$, $H_4$, and $H_5$.

In operation 830, the communication device 340 transmits private parameters to one or more authorized nodes. Once the authorized nodes have their private parameters and both the senders and receivers have the public parameters, the authorized nodes are able to send secure messages that the receivers can authenticate. In some example embodiments, the private parameters are transmitted using a secure channel. The private parameters may be a partial private key comprising the tuple $$psk_{id} = (sk_1, pk_1, \{(X_v, Y_v) | v \in \text{Path}(v_{id})\})$$

where $\text{Path}(v_{id})$ is the set of nodes in the tree along the path from the root node to the leaf node $v_{id}$, including the root node and $v_{id}$. The component values of $psk_{id}$ may be determined using the equations below.

$$\forall v \in \text{Path}(v_{id}):$$

$$t_1 \xleftarrow{R} Z_p^*$$

$$X_v = g^{t_1}$$

$$Y_v = h^{f_v(id)} H_1(id)^{t_1}$$

$$t_3 \xleftarrow{R} Z_p^*$$

$$pk_1 = g^{t_3}$$

$$sk_1 = t_3 + \alpha H_3(id, g^{t_3}, g^\alpha, g^\beta)$$

In the equations above, id is an identifier associated with the node $v_{id}$, and h, g, $H_1$, $H_3$, and $f_v$ are part of the parameters generated in operation 810.

In operation 840, the revocation device 320 revokes one or more of the authorized nodes. For example, the key generating system 142 may keep a list of nodes, a tree structure of nodes, or both. The list or tree structure may include a field to indicate whether the node is authorized or unauthorized.

The update device 330, in operation 850, publishes cover set data. The cover set data indicates, directly or indirectly, which publishers are currently authorized. Note that prior to operation 840, while all nodes are authorized, the operation 850 may be performed using a cover set of the root node. In some example embodiments, the equations below are used:

$$\forall v \in CSet_T:$$
$$t_2 \xleftarrow{R} Z_p^*$$
$$E_v = g^{t_2}$$
$$F_v = h^{f_v(T)} H_1(T)^{t_2}$$

The published cover set data is $ku_T = \{(E_v, F_v) | v \in CSet_T\}$.

In the equations above, $CSet_T$ is the set of nodes covering only the authorized leaf nodes at time T, and h, $H_1$, and $f_v$ are part of the parameters generated in operation 810.

Figure 9:
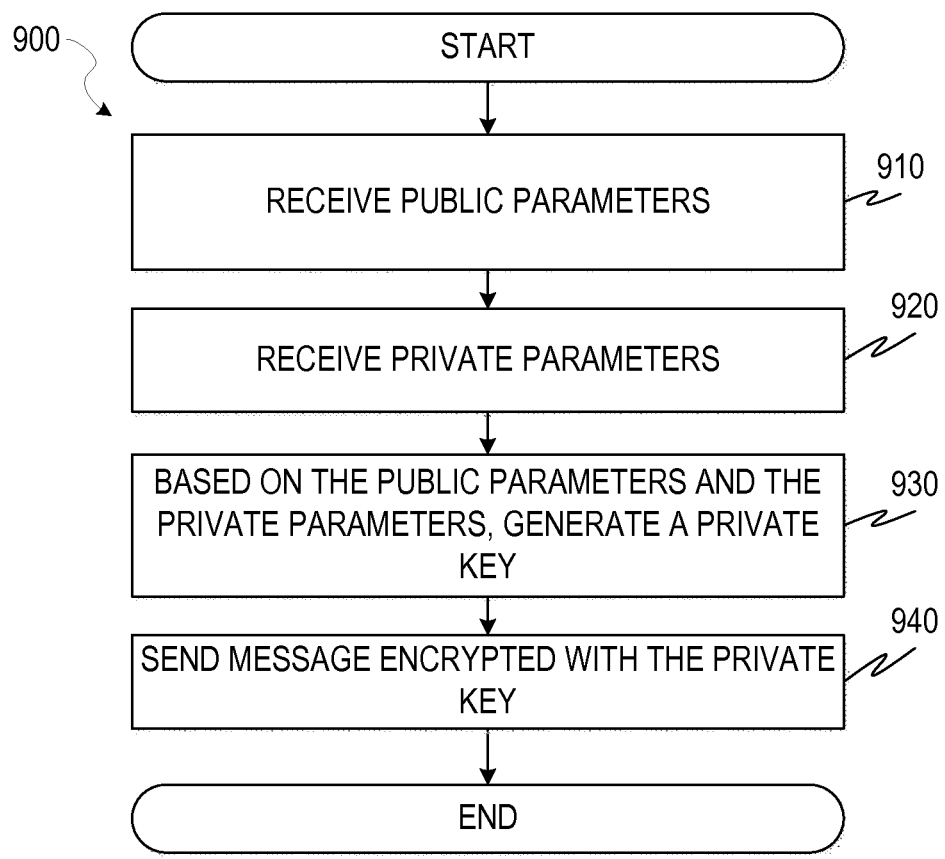
FIG. 9 is a flow diagram illustrating operations of a computer system suitable for generating verifiable messages using certificateless data verification with revocable signatures, according to some example embodiments.

FIG. 9 is a flow diagram illustrating operations of a computer system implementing a process 900 suitable for supporting certificateless data verification with revocable signatures, according to some example embodiments. By way of example and not limitation, the operations of the method 900 are described as being performed by the third-party server 130 of FIG. 1.

In operation 910, the publishing application 132 receives public parameters for an encryption system. For example, the parameters published by the key generating system 142 in operation 820 may be received.

The publishing application 132 also, in operation 920, receives private parameters for the encryption system. For example, the third-party server 130 may be an authorized node and receive private parameters transmitted in operation 830 by the key generating system 142.

In operation 930, the publishing application 132 generates a private key based on the public parameters and the private parameters. In some example embodiments, the equations below are used, referencing values discussed in operations 820 and 830.

$$\gamma \xleftarrow{R} Z_p^*$$
$$sk_{id} = (\gamma, sk_1, \{(X_v, Y_v) | v \in Path(v_{id})\}).$$

In operation 940, the publishing application 132 sends a message encrypted with the private key. In some example embodiments, the equations below are used:

$$pk_{id} = (pk_1, pk_2) = (g^{t_2}, g^{\gamma})$$
$$v = Path(v_{id}) \cap CSet_T$$
$$r_1 \xleftarrow{R} Z_p^*$$
$$U_2 = g^{r_1}$$
$$U_1 = H_0(m)^{r_1} Y_v = H_0(m)^{r_1} (h^{f_v(id)} H_1(id)^{r_1})$$
$$Q_1 = H_4(m, id, pk_1, pk_2, U_1, U_2, X_v, E_v, F_v)$$
$$Q_2 = H_5(m, id, pk_1, pk_2, U_1, U_2, X_v, E_v, F_v)$$
$$R_1 = Q_1^{\gamma} Q_2^{sk_1}$$

In the equations above, all values not explicitly defined therein are defined by the key generation authority in operations 820, 830, and 850. In this example embodiment, the message m is encrypted using the private key $sk_{id}$ and published along with a name for the content, the id of the signer, the public key $pk_{id}$ to decrypt the message, and a signature block. In this example embodiment, the signature block includes $R_1$, $U_1$, $U_2$, $X_v$, $E_v$, and $F_v$. The signature block may include the public parameters published by the key generation authority in the operation 820 and a time-stamp (e.g., seconds since epoch, a time value provided by the key generation authority, a date, or any suitable combination thereof).

Modules, Components, and Logic

Certain embodiments are described herein as including logic or a number of components, devices, modules, or mechanisms. Devices may be composed of hardware modules, and modules may constitute hardware modules. A "hardware module" is a tangible unit capable of performing certain operations and may be configured or arranged in a certain physical manner In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-9 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the invention in different contexts from the disclosure contained herein.

Software Architecture

Figure 10:
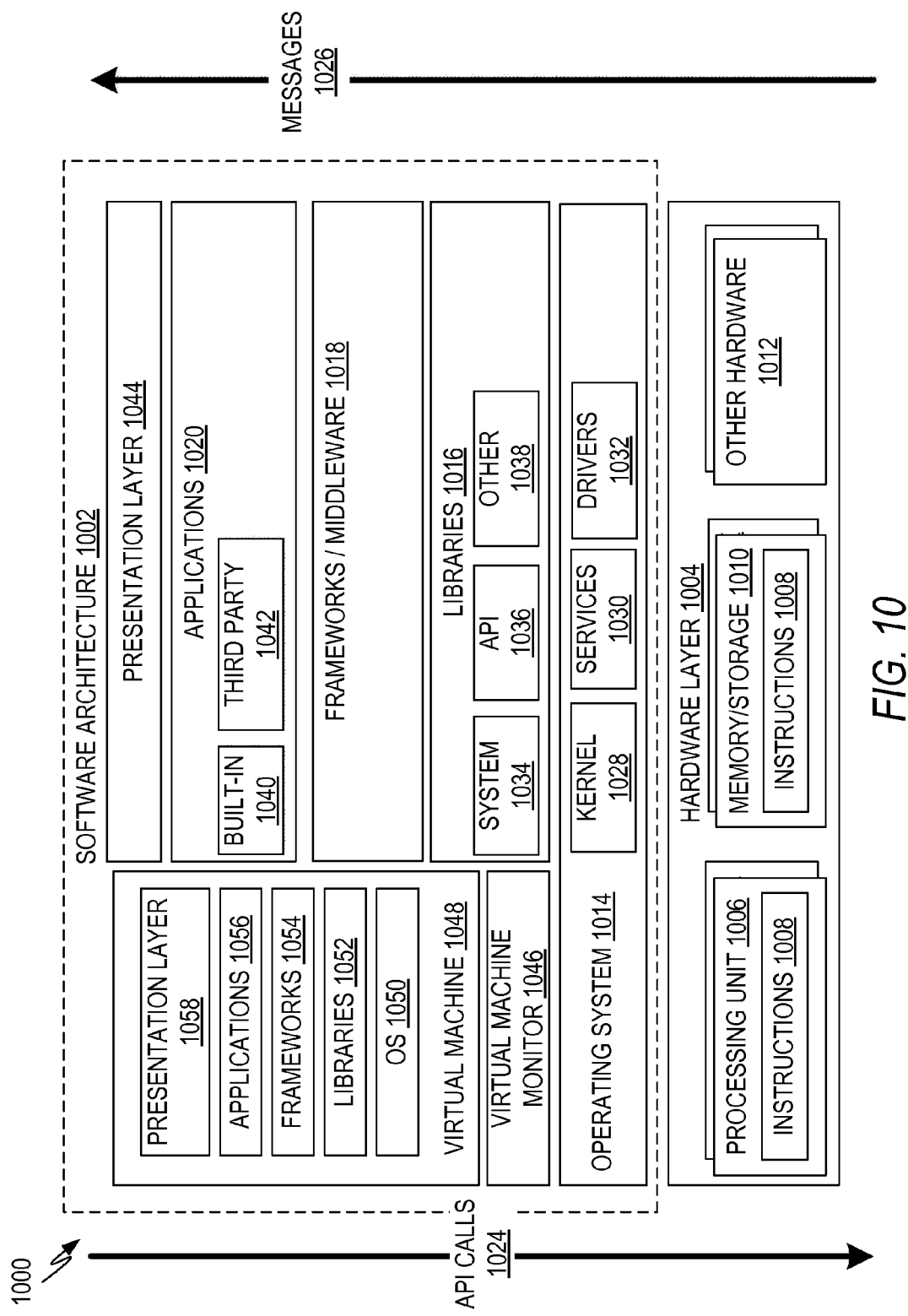
FIG. 10 is a block diagram illustrating an example of a software architecture suitable for supporting, generating, or verifying messages using certificateless data verification with revocable signatures that may be installed on a machine, according to some example embodiments.

FIG. 10 is a block diagram 1000 illustrating a representative software architecture 1002, which may be used in conjunction with various hardware architectures herein described. FIG. 10 is merely a non-limiting example of a software architecture, and it will be appreciated that many other architectures may be implemented to facilitate the functionality described herein. The software architecture 1002 may be executing on hardware such as a machine 1100 of FIG. 11 that includes, among other things, processors 1110, memory/storage 1130, and I/O components 1150. A representative hardware layer 1004 is illustrated and can represent, for example, the machine 1100 of FIG. 11. The representative hardware layer 1004 comprises one or more processing units 1006 having associated executable instructions 1008. The executable instructions 1008 represent the executable instructions of the software architecture 1002, including implementation of the methods, modules, and so forth of FIGS. 1-9. The hardware layer 1004 also includes memory or storage modules 1010, which also have the executable instructions 1008. The hardware layer 1004 may also comprise other hardware 1012, which represents any other hardware of the hardware layer 1004, such as the other hardware illustrated as part of the machine 1100.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020, and a presentation layer 1044. Operationally, the applications 1020 or other components within the layers may invoke application programming interface (API) calls 1024 through the software stack and receive a response, returned values, and so forth illustrated as messages 1026 in response to the API calls 1024. The layers illustrated are representative in nature, and not all software architectures have all layers. For example, some mobile or special purpose operating systems may not provide a frameworks/middleware 1018 layer, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1016 may provide a common infrastructure that may be utilized by the applications 1020 or other components or layers. The libraries 1016 typically provide functionality that allows other software modules to perform tasks in an easier fashion than to interface directly with the underlying operating system 1014 functionality (e.g., kernel 1028, services 1030, or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks/middleware 1018 may provide a higher-level common infrastructure that may be utilized by the applications 1020 or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be utilized by the applications 1020 or other software components/modules, some of which may be specific to a particular operating system or platform.

The applications 1020 include built-in applications 1040 or third party applications 1042. Examples of representative built-in applications 1040 include, but are not limited to, a contacts application, a browser application, a book reader application, a location application, a media application, a messaging application, or a game application. The third party applications 1042 may include any of the built-in applications as well as a broad assortment of other applications. In a specific example, the third party application 1042 (e.g., an application developed using the Android™ or iOS™ software development kit (SDK) by an entity other than the vendor of the particular platform) is mobile software running on a mobile operating system such as iOS™, Android™, Windows® Phone, or other mobile operating systems. In this example, the third party application 1042 invokes the API calls 1024 provided by the mobile operating system such as the operating system 1014 to facilitate functionality described herein. The parameter module 310, revocation module 320, update module 330, and communication module 340 of the key generating system 142, and the verification module 210, decryption module 220, and communication module 230 of the security unit 114 may be implemented as one or more of the third party applications 1042.

The applications 1020 may utilize built in operating system functions (e.g., kernel 1028, services 1030, and/or drivers 1032), libraries (e.g., system libraries 1034, API libraries 1036, and other libraries 1038), and frameworks/middleware (e.g., frameworks/middleware 1018) to create user interfaces to interact with users of the system. Alternatively, or additionally, in some systems interactions with a user may occur through a presentation layer, such as the presentation layer 1044. In these systems, the application/module "logic" can be separated from the aspects of the application/module that interact with a user.

Some software architectures utilize virtual machines. In the example of FIG. 10, this is illustrated by a virtual machine 1048. A virtual machine creates a software environment where applications/modules can execute as if they were executing on a hardware machine (e.g., such as the machine 1100 of FIG. 11). A virtual machine is hosted by a host operating system (e.g., operating system 1014 in FIG. 10) and typically, although not always, has a virtual machine monitor 1046, which manages the operation of the virtual machine as well as the interface with the host operating system (e.g., operating system 1014). A software architecture executes within the virtual machine, including one or more of an operating system 1050, libraries 1052, frameworks/middleware 1054, applications 1056, or presentation layer 1058. These layers of software architecture executing within the virtual machine 1048 can be the same as corresponding layers previously described or may be different.

Example Machine Architecture and Machine-Readable Medium

Figure 11:
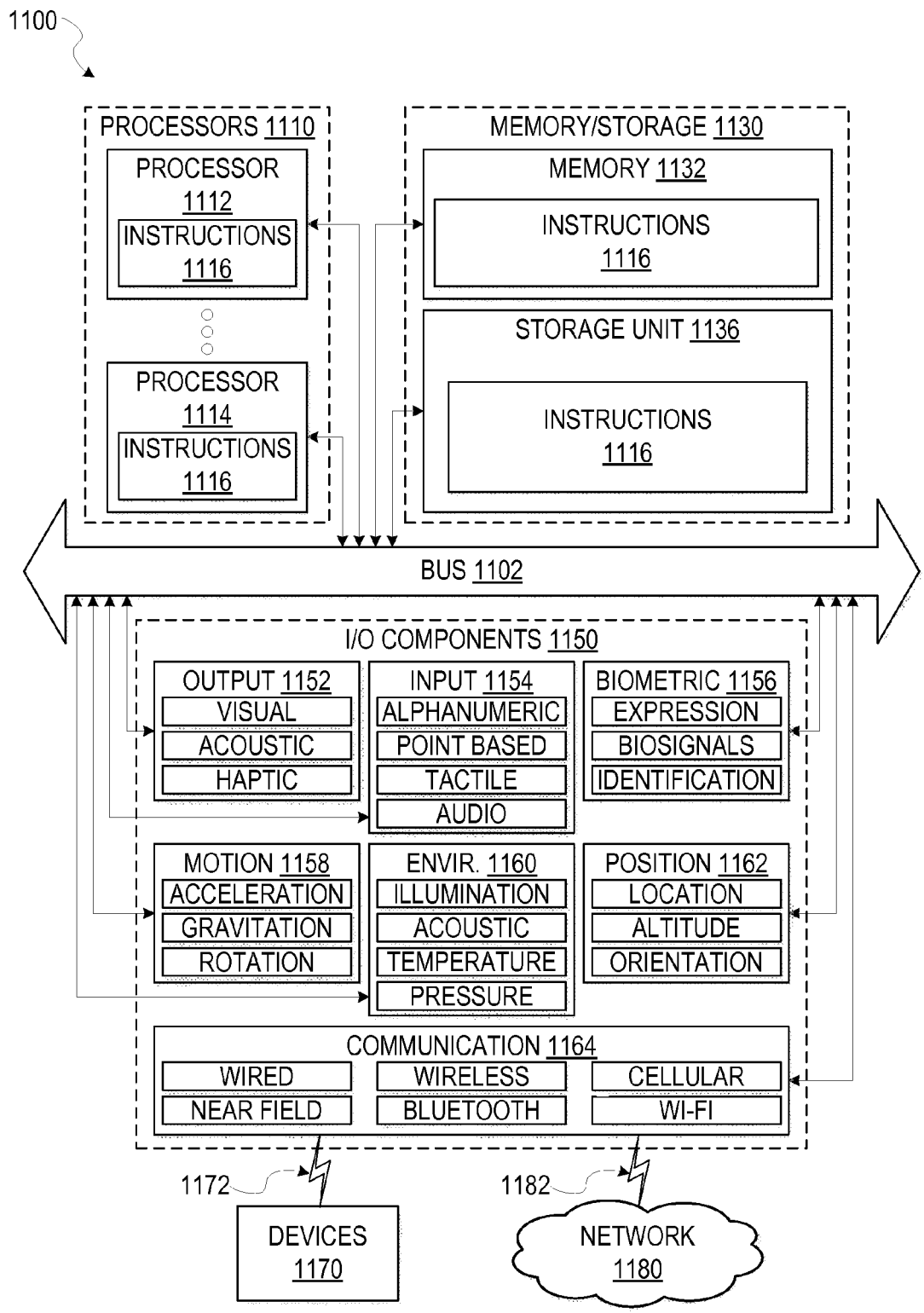
FIG. 11 is a diagrammatic representation of a machine in the form of a computer system within which a set of instructions may be executed for supporting, generating, or verifying messages using certificateless data verification with revocable signatures, according to an example embodiment.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example the instructions 1116 may cause the machine 1100 to execute the flow diagrams of FIGS. 6-9. Additionally or alternatively, the instructions 1116 may implement the verification device 210, the decryption device 220, and the communication device 230 of FIG. 2. Furthermore, additionally or alternatively, the instructions 1116 may implement the parameter device 310, the revocation device 320, the update device 330, and the communication device 340 of FIG. 3. The instructions transform the general, non-programmed machine into a particular machine programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but is not limited to, a server computer, a client computer, a personal computer (PC), or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory/storage 1130, and I/O components 1150, which may be configured to communicate with each other such as via a bus 1102. In an example embodiment, the processors 1110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1112 and a processor 1114 that may execute the instructions 1116. The term "processor" is intended to include multi-core processors that comprise two or more independent processors (sometimes referred to as "cores") that may execute instructions contemporaneously. Although FIG. 11 shows multiple processors, the machine 1100 may include a single processor with a single core, a single processor with multiple cores, multiple processors with a single core, multiple processors with multiples cores, or any combination thereof.

The memory/storage 1130 may include a memory 1132, such as a main memory, or other memory storage, and a storage unit 1136, each accessible to the processors 1110, such as via the bus 1102. The storage unit 1136 and memory 1132 store the instructions 1116 embodying any one or more of the methodologies or functions described herein. The instructions 1116 may also reside, completely or partially, within the memory 1132, within the storage unit 1136, within at least one of the processors 1110 (e.g., within the processor's cache memory), or any suitable combination thereof, during execution thereof by the machine 1100. Accordingly, the memory 1132, the storage unit 1136, and the memory of the processors 1110 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), or any suitable combination thereof. The term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions, when executed by one or more processors of the machine (e.g., processors 1110), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1150 may include a wide variety of components to receive input, provide output, produce output, transmit information, exchange information, capture measurements, and so on. The specific I/O components 1150 that are included in a particular machine will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location or force of touches or touch gestures, or other tactile input components), audio input components (e.g., a microphone), and the like.

In further example embodiments, the I/O components 1150 may include biometric components 1156, motion components 1158, environmental components 1160, or position components 1162 among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172 respectively. For example, the communication components 1164 may include a network interface component or other suitable device to interface with the network 1180. In further examples, the communication components 1164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a Universal Serial Bus (USB)).

Moreover, the communication components 1164 may detect identifiers or include components operable to detect identifiers. For example, the communication components 1164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 1180 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, devices, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   accessing, by a processor of a machine an encrypted data packet from a first source, the encrypted data packet being accompanied by a signature of the first source;
   accessing, by the processor, parameters from a second source, the parameters comprising a plurality of hash functions and a set of values, the set of values comprising results from evaluation of a corresponding set of equations, the evaluation operating on a time value;
   verifying, by the processor, based on the signature of the first source and the parameters, that the encrypted data packet was generated by the first source, the verifying comprising determining, based on the set of values, that the first source corresponds to an authorized leaf node in a tree maintained by the second source; and based on the verification that the encrypted data packet was generated by the first source, decrypting, by the processor, the encrypted data packet.

2. The method of claim 1, wherein:
the signature of the first source comprises a first key and a second key; and
the verifying that the encrypted data packet was generated by the first source comprises applying the plurality of hash functions to the first key and the second key.

3. The method of claim 2, wherein:
the verifying that the encrypted data packet was generated by the first source comprises applying the plurality of hash functions to a message portion of the encrypted data packet.

4. The method of claim 1, wherein:
the parameters from the second source comprise a time value; and
the verifying that the encrypted data packet was generated by the first source is further based on the time value.

5. The method of claim 1, further comprising:
accessing a name associated with the encrypted data packet; and
verifying that the name corresponds to the first source.

6. A system comprising:
a communication device configured to:
  access an encrypted data packet from a first source, the encrypted data packet being accompanied by a signature of the first source; and
  access parameters from a second source, the parameters comprising a plurality of hash functions and a set of values, the set of values comprising results from evaluation of a corresponding set of equations, the evaluation operating on a time value;
a processor-implemented verification device configured to:
  verify, based on the signature of the first source and the parameters, that the encrypted data packet was generated by the first source, the verifying comprising determining, based on the set of values, that the first source corresponds to an authorized leaf node in a tree maintained by the second source; and
decryption device configured to:
  based on the verification that the encrypted data packet was generated by the first source, decrypt the encrypted data packet.

7. The system of claim 6, wherein:
the signature of the first source comprises a first key and a second key; and
the verifying that the encrypted data packet was generated by the first source comprises applying the plurality of hash functions to the first key and the second key.

8. The system of claim 7, wherein:
the verifying that the encrypted data packet was generated by the first source comprises applying the plurality of hash functions to a message portion of the encrypted data packet.

9. The system of claim 6, wherein:
the parameters from the second source comprise a time value; and
the verifying that the encrypted data packet was generated by the first source is further based on the time value.

10. The system of claim 6, wherein the verification device is further configured to:
access a name associated with the encrypted data packet; and
verify that the name corresponds to the first source.

11. A machine-readable medium not having any transitory signals and having instructions embodied thereon which, when executed by one or more processors of a machine, cause the machine to perform operations comprising:
accessing an encrypted data packet from a first source, the encrypted data packet being accompanied by a signature of the first source;
accessing parameters from a second source, the parameters comprising a plurality of hash functions and a set of values, the set of values comprising results from evaluation of a corresponding set of equations, the evaluation operating on a time value;
verifying, based on the signature of the first source and the parameters, that the encrypted data packet was generated by the first source, the verifying comprising determining, based on the set of values, that the first source corresponds to an authorized leaf node in a tree maintained by the second source; and
based on the verification that the encrypted data packet was generated by the first source, decrypting the encrypted data packet.

12. The machine-readable medium of claim 11, wherein:
the signature of the first source comprises a first key and a second key; and
the verifying that the encrypted data packet was generated by the first source comprises applying the plurality of hash functions to the first key and the second key.

13. The machine-readable medium of claim 12, wherein:
the verifying that the encrypted data packet was generated by the first source comprises applying the plurality of hash functions to a message portion of the encrypted data packet.

14. The machine-readable medium of claim 11, wherein:
the parameters from the second source comprise a time value; and
the verifying that the encrypted data packet was generated by the first source is further based on the time value.

* * * * *